United States Patent
Chabot (10) Patent No.: US 6,893,071 B2
(45) Date of Patent: May 17, 2005

(54) ROLL-UP TRUCK COVER ASSEMBLY

(76) Inventor: John P. Chabot, 51-28 Midfield Dr., Waterbury, CT (US) 06705

( * ) Notice: Subject to any disclaimer, the term of this patent is extended or adjusted under 35 U.S.C. 154(b) by 48 days.

(21) Appl. No.: 10/689,315

(22) Filed: Oct. 20, 2003

(65) Prior Publication Data

US 2004/0135392 A1 Jul. 15, 2004

Related U.S. Application Data

(60) Provisional application No. 60/419,796, filed on Oct. 21, 2002.

(51) Int. Cl.$^7$ ................................................. B60P 7/04
(52) U.S. Cl. ............... 296/98; 296/100.15; 296/100.18; 160/71
(58) Field of Search .............................. 296/98, 100.01, 296/100.11, 100.12, 100.13, 100.14, 100.15, 100.18; 160/71, 80

(56) References Cited

U.S. PATENT DOCUMENTS

| | | | | | |
|---|---|---|---|---|---|
| 4,030,780 | A | * | 6/1977 | Petretti | 296/98 |
| 4,050,734 | A | * | 9/1977 | Richard | 296/98 |
| 4,082,347 | A | * | 4/1978 | Petretti | 296/98 |
| 4,341,416 | A | * | 7/1982 | Richard | 296/98 |
| 4,516,802 | A | * | 5/1985 | Compton | 296/98 |
| 4,874,196 | A | * | 10/1989 | Goldstein et al. | 296/98 |
| 5,292,169 | A | * | 3/1994 | O'Brian | 296/98 |
| 5,380,058 | A | * | 1/1995 | Short et al. | 296/98 |
| 5,806,911 | A | * | 9/1998 | Haddad, Jr. | 296/100.14 |
| 5,829,818 | A | * | 11/1998 | O'Daniel | 296/98 |
| 6,474,718 | B1 | * | 11/2002 | Henning | 296/98 |
| 6,698,817 | B1 | * | 3/2004 | O'Brian | 296/98 |
| 2004/0056505 | A1 | * | 3/2004 | Smith | 296/98 |

* cited by examiner

Primary Examiner—Patricia Engle
(74) Attorney, Agent, or Firm—John R. Doherty (57) ABSTRACT

An improved roll-up truck cover assembly is provided for use on trucks having a rectangular open truck body carrying gravel, loose dirt and the like. The roll-up truck cover assembly comprises a rectangular flexible top cover attached at one end to the front wall of the truck body and at the other end to a take-up roll including a biasing member tending to rotate the roll in a take-up operation. A pair of elongated swinging arms are provided one on each opposite side wall of the truck body. The swinging arms may comprise, for example, a first or upper elongated tube or rod rotatably connected at one end to the take-up roll. The first or upper elongated tube or rod is telescopically and retractably mounted at its other end within a second or lower larger diameter tube pivotally mounted to a lower end portion of one of the side walls of the truck body. A roller and an elongated roller guide track are provided for each swinging arm on each opposite side wall of the truck body. Each roller is rotatably mounted onto a shaft which is attached to the first or upper tube of each swinging arm and are moveably engaged within each of the guide tracks. Means are provided for pivotally moving the swinging arms along the opposite side walls of the truck body in an arch-like manner from one to the other opposite end of the truck. The take-up roll and top cover travel along with the swinging arms and the cover is unwound from the take-up roll in one direction covering the open end of the truck body and then wound onto the take-up roll in the opposite direction during the take-up operation. The rollers move along the guide tracks in a straight longitudinal path causing the first or upper tube or rod to retract within the second or lower tube, keeping to a minimum the height to which the take-up roll and top cover can be raised above the truck body.

18 Claims, 14 Drawing Sheets

ROLL-UP TRUCK COVER ASSEMBLY

PRIORITIES

This application claims priority to my provisional application Serial No. 60/419,796, filed on Oct. 21, 2002.

BACKGROUND OF THE INVENTION

This invention relates to an improved roll-up truck cover assembly of the type wherein a flexible cover is secured at one end of a take-up roll mounted to a pair of swinging arms, one on each side of the truck body, for moving the cover from an open to a closed position over the top opening of the truck to cover a material load, such as gravel or loose dirt. The cover assembly is further adapted to move the cover in an opposite direction to an open position when the load is to be removed. Typically, the swinging arms are made up of two pipes clamped and bolted together to form a one arm unit on each side of the roll-up cover assembly to extend the cover completely over the load from one to an opposite end of truck body. The swinging arms are driven or swung by hydraulic or fluid operated cylinders.

Roll-up cover assemblies of the type described above are disclosed, for example, in U.S. Pat. Nos. 4,050,734 and 4,341,416 issued to D. B. Richard on Sep. 27, 1977 and Jul. 27, 1982, respectively, the specifications of which are incorporated herein by reference for purposes of background information.

The problem with roll-up truck cover assemblies of the above type is that in order to dispense the cover from the take-up roll over the entire length of the top opening of the truck body and then to move the cover in an opposite direction, it is necessary to rotate the swinging arms in an arch-like fashion to a maximum height at a point somewhere midway along the length of the truck body. Unfortunately, this action in some cases results in the take-up roll and/or cover striking a local over-hanging object, such as a tree branch, for example, or in more hazardous cases, over-hanging electrical transmission wires or cables. This is particularly true in cases where larger and longer trucks, such as a trailers are employed, which in turn require larger and longer covers, as well as longer and taller swinging arms to move the cover.

It is therefore an important object of this invention to provide an improved roll-up truck cover assembly wherein the take-up roll and cover travel over an arch-like path in which the maximum height of the roll and cover above the top opening of the truck body is kept to a minimum or, stated in other words, in which the roll and cover travel in a lower arch-like or more horizontal path over the top opening than has been heretofore possible with similar truck cover assemblies of the prior art.

SUMMARY OF THE INVENTION

The foregoing and other related objects are achieved in accordance with the invention by an improved roll-up truck cover assembly for use on trucks of the general type having a rectangular open truck body defined by upstanding side and end walls for carrying material loads such as gravel, loose dirt and the like. The improved roll-up truck cover assembly comprises a generally rectangular flexible top cover which is substantially co-extensive with the opening of the truck body. The top cover is attached at one end to the front wall of the truck body and at the other end to a take-up roll for supporting and storing the cover when not in use. The take-up roll usually has associated with it a biasing means tending to rotate the roll in a take-up operation.

The roll-up truck cover assembly of the invention further includes a pair of elongated swinging arms one of each of which is positioned adjacent to one of the opposite side walls of the truck body. The swinging arms each comprise first and second elongated members at least one of which is tubular and the other of which is telescopically and retractably mounted within the tubular member such that the length of each arm is variable and can be changed by sliding one member into or out of the other member. The first elongated member of each swinging arm is rotatably connected to the take-up roll including the top cover while the second elongated member is pivotally mounted to a lower end portion of an opposite side wall of the truck body.

A roller and an elongated roller guide track are provided for each swinging arm on the opposite side walls of the truck body. The roller is rotatably mounted onto a shaft which is attached to the first member of each swinging arm. The roller guide tracks are mounted substantially longitudinally on the opposite side walls of the truck body and the rollers are moveably engaged within each of the guide tracks.

Means are provided for pivotally moving the swinging arms along each of the opposite side walls of the truck body. The swinging arms move in an arch-like manner from one to the other opposite end of truck body. The take-up roll and top cover travel along with the swinging arms and the cover is unwound from the take-up roll in one direction covering the open end of the truck body and then wound onto the take-up roll in the opposite direction during the take-up operation. The arrangement of the roll-up truck cover assembly is such that movement of the rollers along the guide tracks causes the elongated tubular member to retract within the other elongated member, keeping to a minimum the height to which the take-up roll and top cover can be raised above the truck body.

DESCRIPTION OF A PREFERRED EMBODIMENT

Figure 1:
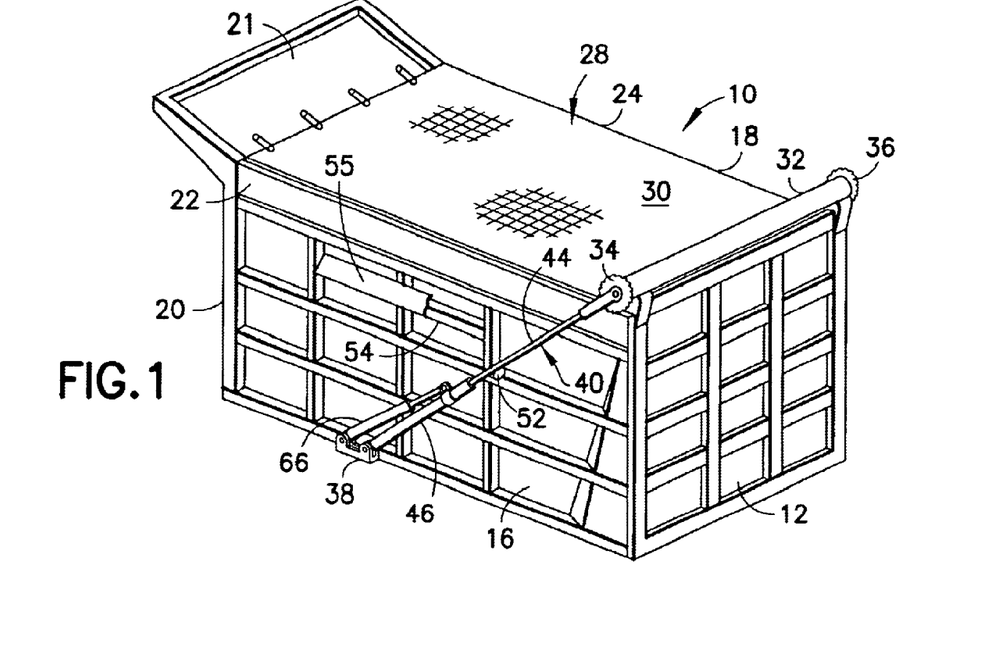
FIG. 1 is a perspective view of a conventional truck body incorporating an improved roll-up cover assembly according to the invention.
Figure 2:
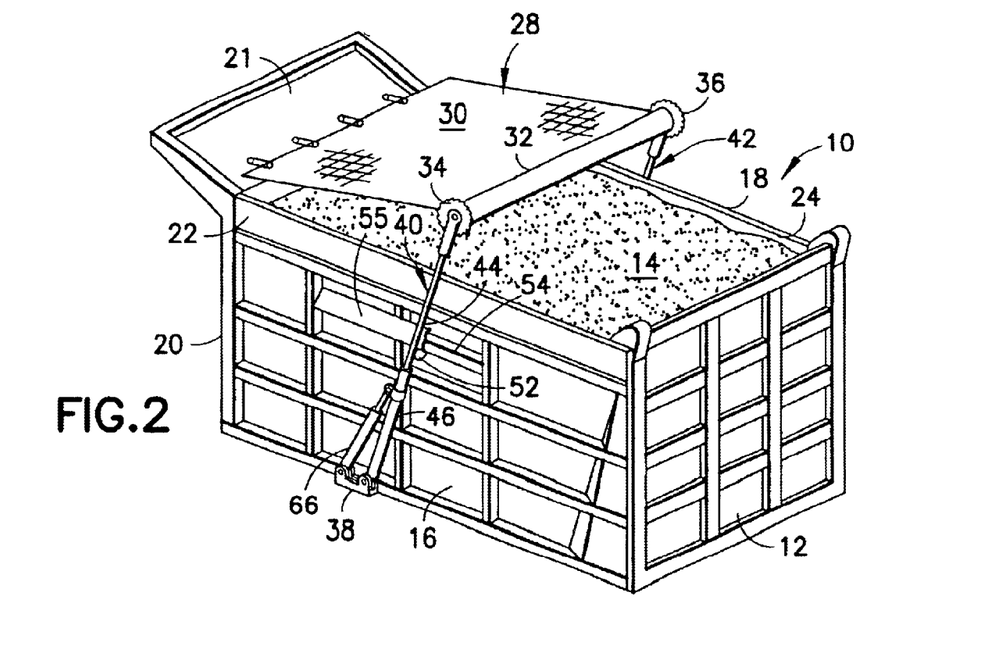
FIG. 2 is a similar view showing the cover assembly withdrawn about midway between the front and rear walls of the truck body.

Referring particularly to FIGS. 1 and 2 of the drawing, there is shown a conventional truck body indicated generally at 10, the cab portion and truck under-carriage including the wheels being omitted for the purposes of simplicity, these portions of the truck assembly actually forming no essential part of the invention. The truck is of the dump variety including a rear-end wall or hinged gate 12 which may be opened in a conventional manner to release the load 14, which may be sand, gravel or dirt fill, for example. The truck body 10 further includes left and right-hand side walls 16, 18 as seen in FIGS. 1 and 2 and in FIG. 6, respectively, and a front wall 20. The side walls are formed with plank-like wood upper sections 22, 24, respectively, which help to retain the load in place. The front wall 20 has an upper or forwardly extending portion forming a conventional headboard 21 which extends substantially above the side walls 16, 18 and the cab portion of the truck (not shown).

A cover assembly indicated generally at 28 comprises a flexible cover 30 which is substantially co-extensive with the open end or cross-section of the truck body 10. The cover 30 may be constructed of canvas or other flexible material and is attached to the rear edge of the headboard 21. The headboard 21 is attached to the front wall 20.

The cover assembly also includes a take-up roll 32 to which the opposite or rear end portion of the flexible cover 30 is attached. The take-up roll 32 includes biasing means tending to rotate the roll in a direction effecting a take-up operation on the cover 30. The specific construction of the take-up roll may vary, but preferably, it is essentially of the same type as disclosed in the above referred to U.S. Pat. No. 4,050,734 and shown in FIG. 3. As shown, the cover 30 is bolted to an outer tubular portion of the take-up roll 32 whose width is substantially the same or slightly larger than the width of the truck body 10. An elongated shaft 33 extends through the tubular take-up roll and passes through openings in a pair of hubs 34, 36, one at each end of the take-up roll 32. The biasing means may take the form of a coil spring 37 which is operatively associated with the elongated shaft 33 mounted in the take-up roll 32. The arrangement is such as to cause the take-up roll 32 to rotate in a counterclockwise direction which causes the cover 30 to assume a roll-up or take-up position on the roll. Thus, the cover 30 is at all times maintained and extended in a somewhat taut or slightly tensioned condition as the take-up roll 32 moves in an arch-like path forwardly and/or rearwardly, traversing the length of the truck body 10. The take-up roll 32 works, for example, in the same manner as a window shade. The shade rolls as it travels up and down the window.

Figure 7:
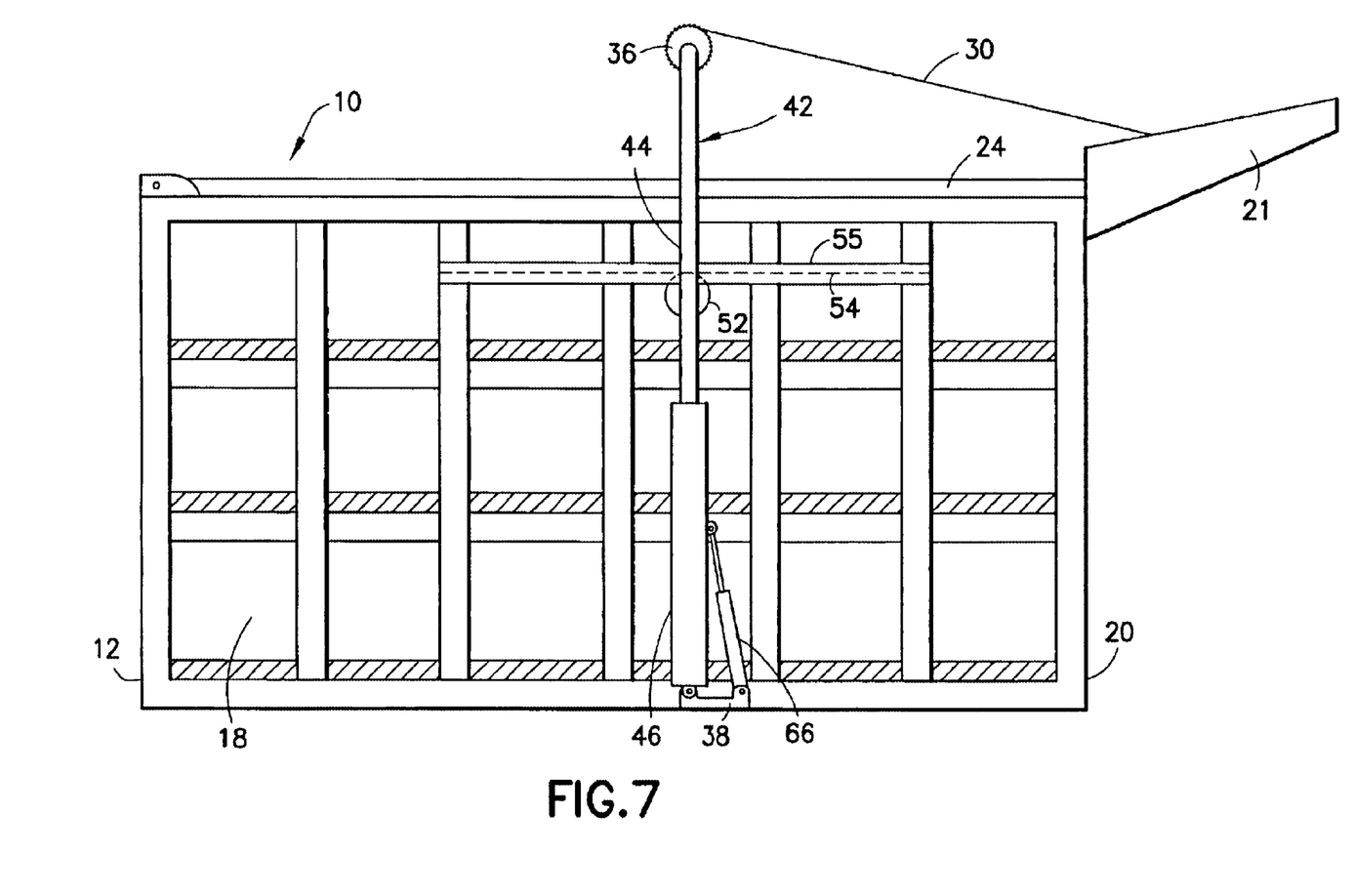
FIG. 7 is a side elevational view of the truck body showing the opposite right side thereof.

In accordance with the invention, there is provided a novel and improved operative mechanism, as best seen in FIGS. 1 and 2, for an arch-like swinging of the take-up roll 32 in a lengthwise direction from a closed or load uncovering position adjacent to the front wall 20 to an open or load covering position adjacent to the opposite rear wall 12 of the truck body 10. The mechanism comprises a pair of elongated swinging side arms indicated generally at 40, 42 located one on each side of the truck body 10. Each of the arms 40, 42 is attached to one of the opposite ends of the shaft 33 passing through the take-up roll 32. The arms 40, 42 are each pivotally mounted at their lower end portions to the side walls 16, 18 of the truck body 10. For this purpose, a mounting bracket 38 is provided on the left-hand side 16 of the truck body 10 as shown in FIGS. 1 and 2 and also an identical mounting bracket 38 is provided on the opposite right-hand side of the truck body 10 as shown in FIG. 7.

The pair of elongated swinging side arms 40, 42 are preferably identical in construction and employ the same or like parts which, for simplicity, will be hereinafter identified by the same reference numerals. Each arm 40, 42 comprises a first or upper elongated member 44 and a second or lower elongated tubular member 46, the former of which is telescopically and retractably mounted within the other so that the overall length of each swinging arm is variable and can be adjusted continuously and automatically as the cover 30 is transported across the length of the truck body 10.

Figure 3:
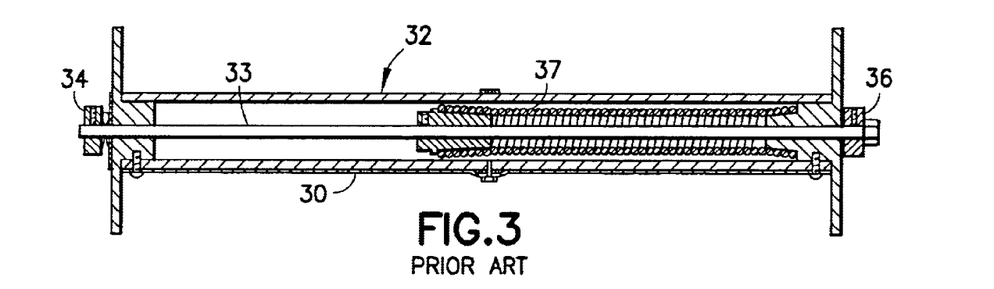
FIG. 3 is a cross-sectional view of a take-up roll employed in the roll-up cover assembly of the invention.
Figure 4:
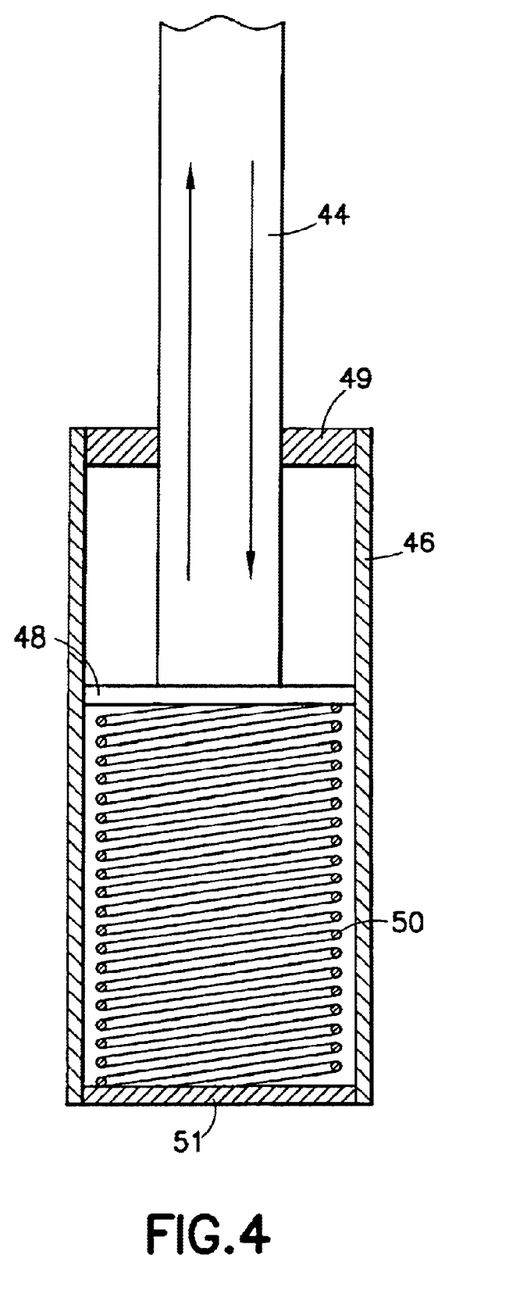
FIG. 4 is an enlarged, partly broken away, elevational view showing one pair of telescoping and retracting arms forming part of the roll-up cover assembly of the invention.
Figure 8:
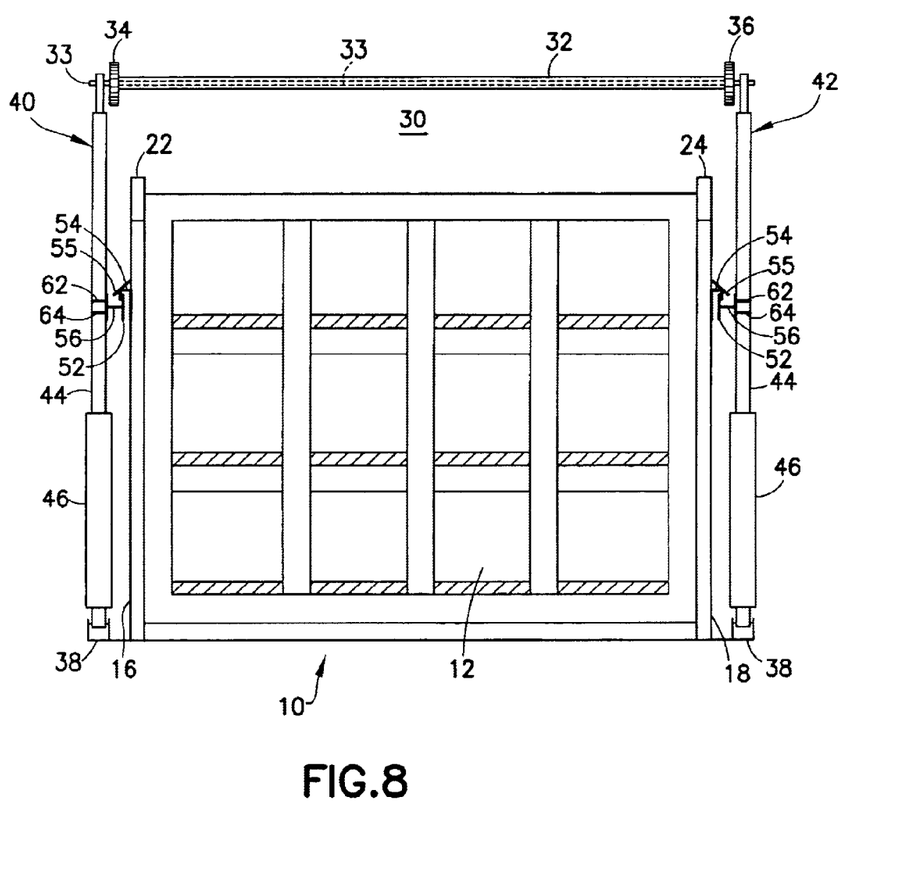
FIG. 8 is an elevational view of the rear of the truck body shown in FIGS. 1 and 2.

In a preferred embodiment of the invention as best shown in FIG. 4, the arrangement of the swinging side arms 40, 42 is chosen such that the first or upper member 44 is a smaller diameter rod or tube and is telescopically and retractably mounted within the larger diameter tubular second or lower member 46. The second or lower tubular member 46 is rotatably mounted at its lower end to one of the mounting brackets 38 on each side of the truck body 10 (see FIGS. 1, 2 and 7). The upper end of the first or upper member 44 is rotatably mounted to one of the hubs 34, 36 at opposite ends of the shaft 33 passing through the take-up roll 32 as best shown in FIGS. 3 and 8.

As can best be seen in FIG. 4, the first or upper member 44 of each arm is formed at its lower end with a larger diameter plate or piston 48 which fits snugly inside the second or lower tubular member 46. A resilient or biasing member, such as a compression spring 50, is provided within the closed bottom end of the second or lower member 46 and continuously urges or biases the first or upper member 44 of each arm in an upper or outward direction. The top end of the second or lower tubular member 46 is closed or sealed by an annular cap 49 while the bottom end of the second or lower tubular member 46 is closed or sealed by an end cap 51.

Figure 5:
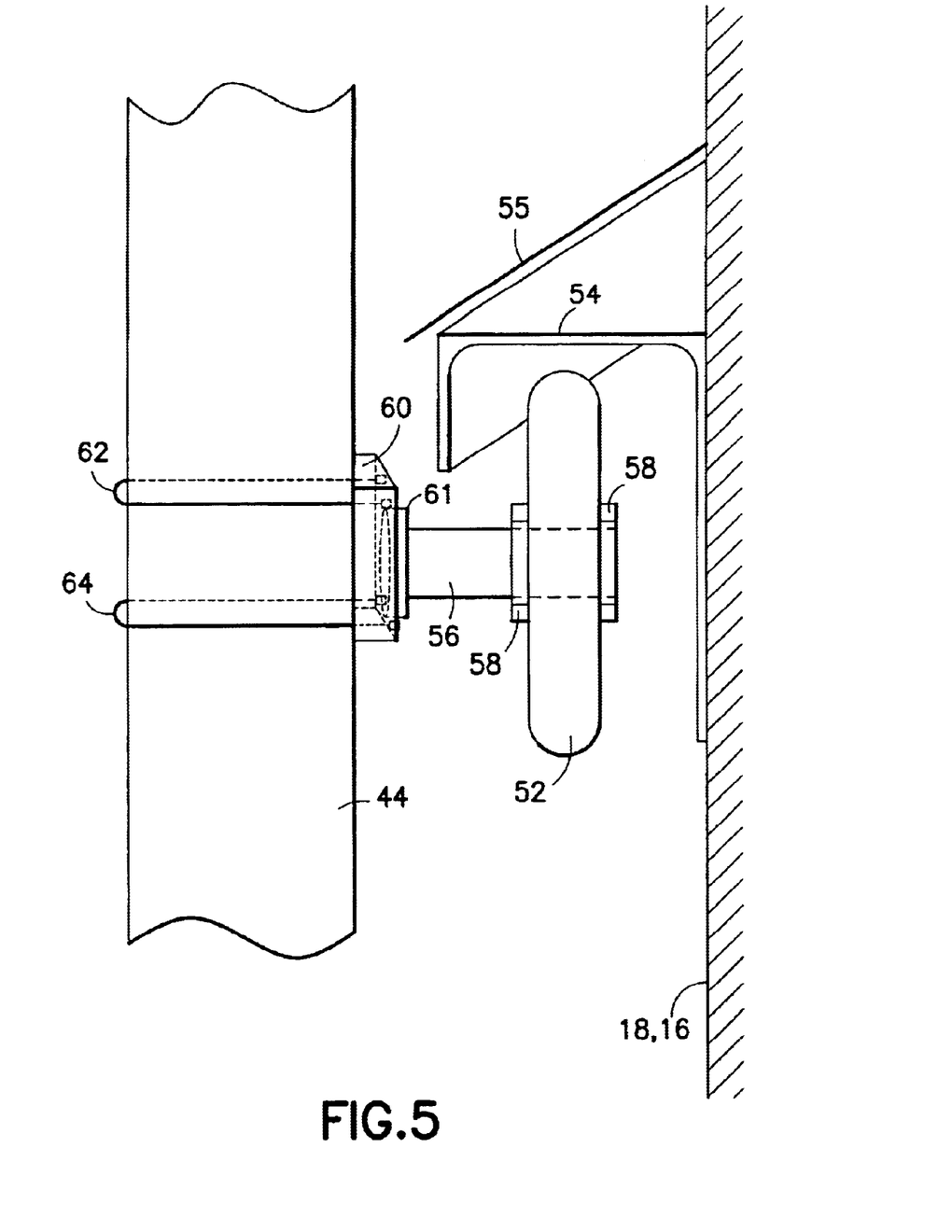
FIG. 5 is a similar view showing one of the roller and roller guide tracks used in the roll-up cover assembly of the invention.
Figure 6:
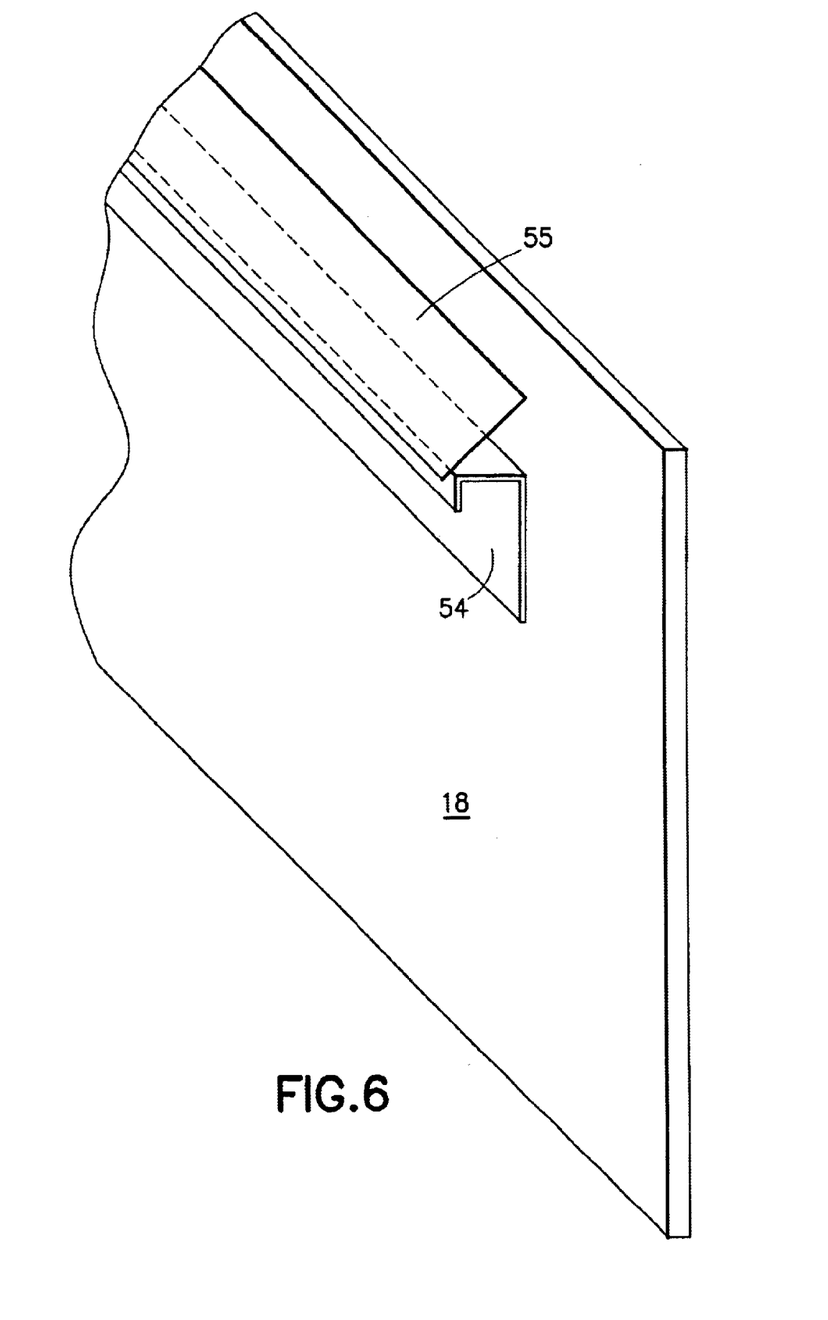
FIG. 6 is a perspective view of the right side of the truck body showing the roller guide track and a protective shield mounted above the track.

Attached to the first or upper member 44 of each swinging arm 40, 42 is a guide roller 52, as best seen in FIG. 5. The roller 52 is adapted to roll back and forth along an elongated, straight, horizontal roller guide track 54 which is mounted to the side walls 16, 18 of the truck body 10 (see FIGS. 2 and 7). The guide track 54 may be a U-shaped channel member or beam, for example, one side of which is secured as by welding to one of the opposite side walls 16, 18 of the truck body. Preferably, a protective shield 55 is mounted above the track 54 as best shown in FIGS. 5 and 6. The shield 55 serves to protect the roller 52 and guide track 54 from damage due to material falling from the loading source, for example, a pay loader or backhoe machine.

The roller 52 is rotatably mounted onto an axle or shaft 56 by means of mounting nuts 58, one on each side of the roller. The shaft 56 is mounted in turn to a U-shaped roller bracket 60 via a threaded plate 61, for example. The bracket 60 is secured as by welding to the first or upper member 44 by means of a pair of large U-bolts 62, 64 as seen in FIG. 5.

The pair of elongated swinging arms 40, 42 are swung along the guide track 54 by a suitable power operated means in at least one direction, that being opposite to the direction in which the biasing means tends to swing the arms while urging the cover 30 in a take-up direction about the take-up roll 32. Preferably, as shown in FIG. 1, the power-operated means is provided for urging the arms 40, 42 in both directions, that is, in the rearward direction for covering the load in the truck body 10 and in the forward direction for closing the cover assembly within the take-up roll 32.

A fluid-operated cylinder 66 may be used as the power-operated means and may be attached between the bracket 38 and the second or lower arm member 46 on both sides of the truck body 10.

During operation of the cover assembly in accordance with the invention, the fluid-operated cylinder 66 is activated and causes the arms 40, 42 to rotated about the brackets 38 located on opposite sides 16, 18 of the truck body 10, unrolling the cover 30 from the take-up roll 32 and moving it in an arch-like path over the top of the load from the front wall 20 toward the rear wall 12. As described herein above, the take-up roll 32, in the past, had to be raised to a maximum height as shown, for example, in FIG. 9, which was high enough that the roll might unfortunately strike a local over-hanging object such as a tree branch. In some cases, where larger truck bodies are employed, requiring larger and longer covers, the take-up roll might unfortunately strike an over-hanging electrical wire or cable, creating a serious and hazardous condition.

This problem is effectively overcome by the present invention wherein the combined assembly of the roller 52 and guide track 54, together with the telescoping and retracting first or upper arms 44, serve to limit the height to which the take-up roll 32 can be raised. The roller 52 and the first or upper member 44 to which it is attached are forced to follow a straight, horizontal path by the guide track 54 as the take-up roll 32 is moved in either direction across the top of the load 14. This action in turn forces the first or upper member 44 of each swinging arm 40, 42 to retract telescopically inside the second or lower tubular member 46, thus reducing the over-all length of each arm and allowing the take-up roll 32 to follow a more horizontal path across the load. The spring 50 (see FIG. 4) inside the second or lower member 46 constantly urges or biases the upper member 44 in an outward direction so that the swinging arms can again assume their normal length after retracting.

Figure 9:
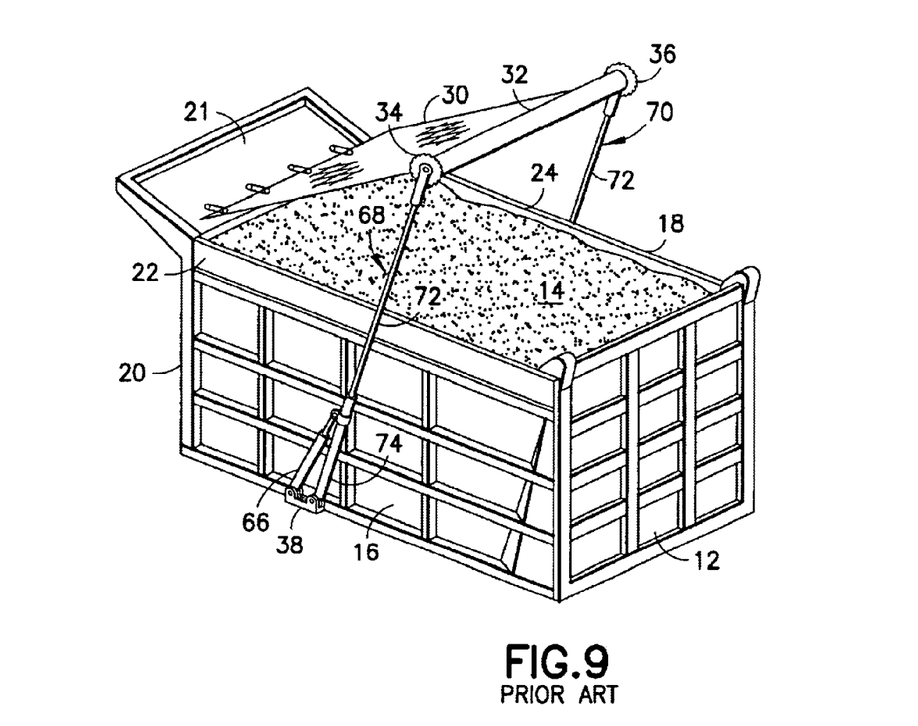
FIG. 9 is a view similar to FIG. 2 but showing a truck roll-up cover representative of the prior art.

The difference in over-all or maximum height to which the take-up roll 32 had to be raised in the prior art verses the same take-up roll in the present invention may be better realized by comparing the roll-up truck cover assembly shown in FIG. 9, representing the prior art, with that of the invention as shown in FIG. 2, for example. The cover assembly of the invention as shown in FIG. 2, raised to its maximum height, is comparatively much lower than is possible with prior art cover assemblies such as shown in FIG. 9 wherein non-retractable swinging arms 68, 70 were employed. Typically, the non-retractable swinging arms 68, 70 were composed, for example, of two pipes, an upper pipe 72 and a lower pipe 74, clamped and bolted together to form a one arm unit on each side of the roll-up cover 30 as described herein above.

Figure 10A:
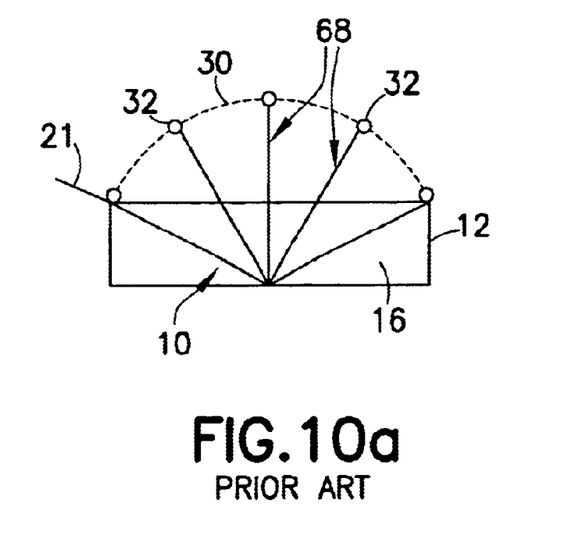
FIGS. 10a and 10b are diagrammatical views showing the various positions of the take-up roll and cover during operation of a prior art roll-up cover assembly compared to the roll-up cover assembly of the present invention.
Figure 10B:
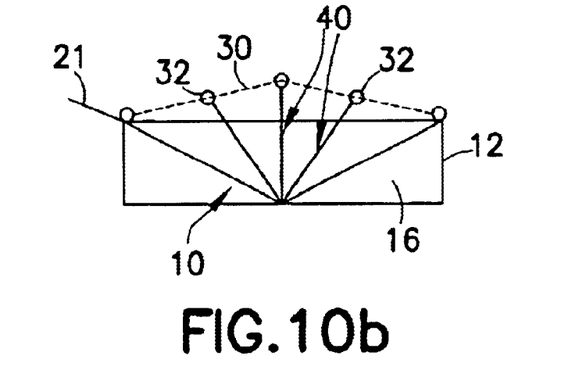

FIGS. 10a and 10b illustrate more dramatically the differences in height of the truck cover 30 that can be achieved by the cover assembly of the present invention. In FIG. 10a, which represents the prior art, the take-up roll 32 is shown in the various positions as it travels in its arch-like pattern across the top of the truck body 10 whereas in FIG. 10b, which represents the present cover assembly, the take-up roll 32 is shown in basically the same positions but at a much lower height above the truck body 10.

Figure 11:
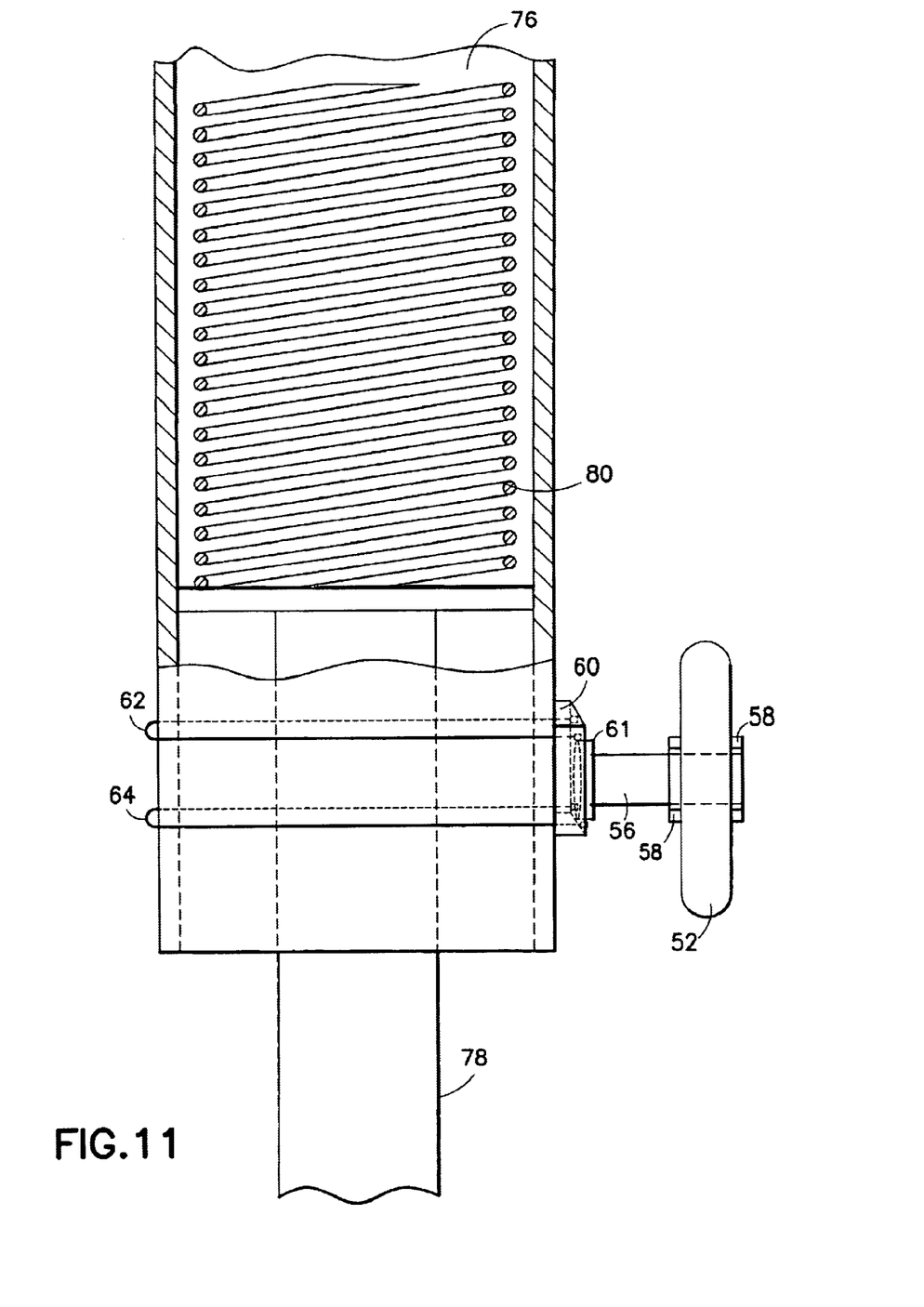
FIG. 11 is a view similar to FIG. 4 showing another embodiment of the truck cover assembly of the invention.

Although the arrangement of the elongated swinging arms 40, 42 described herein above is preferred in the practice of the invention, it is possible of course to reverse the arrangement and employ a first or upper tubular telescoping member 76 which is larger in diameter and which retracts over a second or lower smaller diameter member 78 as illustrated in the embodiment of the invention shown in FIG. 11. The first or larger diameter member 76 may be a hollow tube and the lower or smaller diameter member 78 may be a tube or solid rod, for example. A spring 80 or other compression member is mounted inside the first or upper member 76 and serves to urge or bias the upper member 76 in a direction opposite to or upward away from the second or lower member 78. The construction and operation of the truck cover assembly is otherwise basically the same as described herein above except that the lower end of the smaller diameter member 78 is now attached to one of the two brackets 38 mounted to each side of the truck body 10 and the upper end of the larger diameter member 76 is attached to one of the hubs 34, 36 at each end of the take-up roll 32. Of course, in this embodiment, the roller 52 which travels across the guide track 54 during operation of the cover assembly, must now be mounted externally to the upper larger diameter member 76, along with its axle or shaft 56. As shown in FIG. 11, the roller 52 is attached to the larger diameter upper member 76 using the same bracket 60 and U-bolts 62, 64 as shown in the assembly of FIG. 5.

Figure 12:
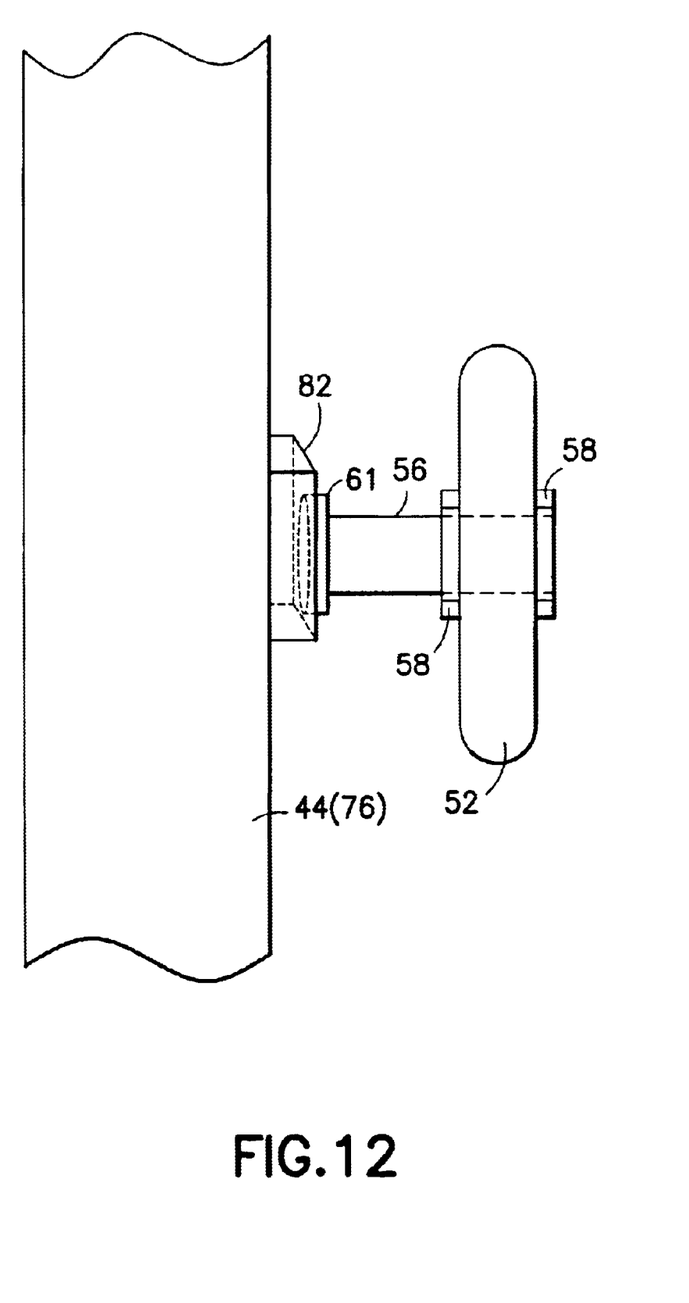
FIG. 12 is a view similar to FIGS. 5 and 11 showing a modification of the truck cover assembly.

A number of modifications of the roll-up cover assembly of the invention are also possible. For example, as shown in FIG. 12, the externally attached U-bolt and bracket assembly described herein above can be replaced by a simple U-shaped bracket 82 which is welded or otherwise secured to one of the upper smaller or larger diameter telescoping members 44 or 76 in either of the above described embodiments shown in FIGS. 4 and 11, for example. The roller 52 is mounted to the axle or shaft 56 using the same pair of mounting nuts 58 and the plate 61 is secured in the same manner to the bracket 82 as described herein above.

Figure 13:
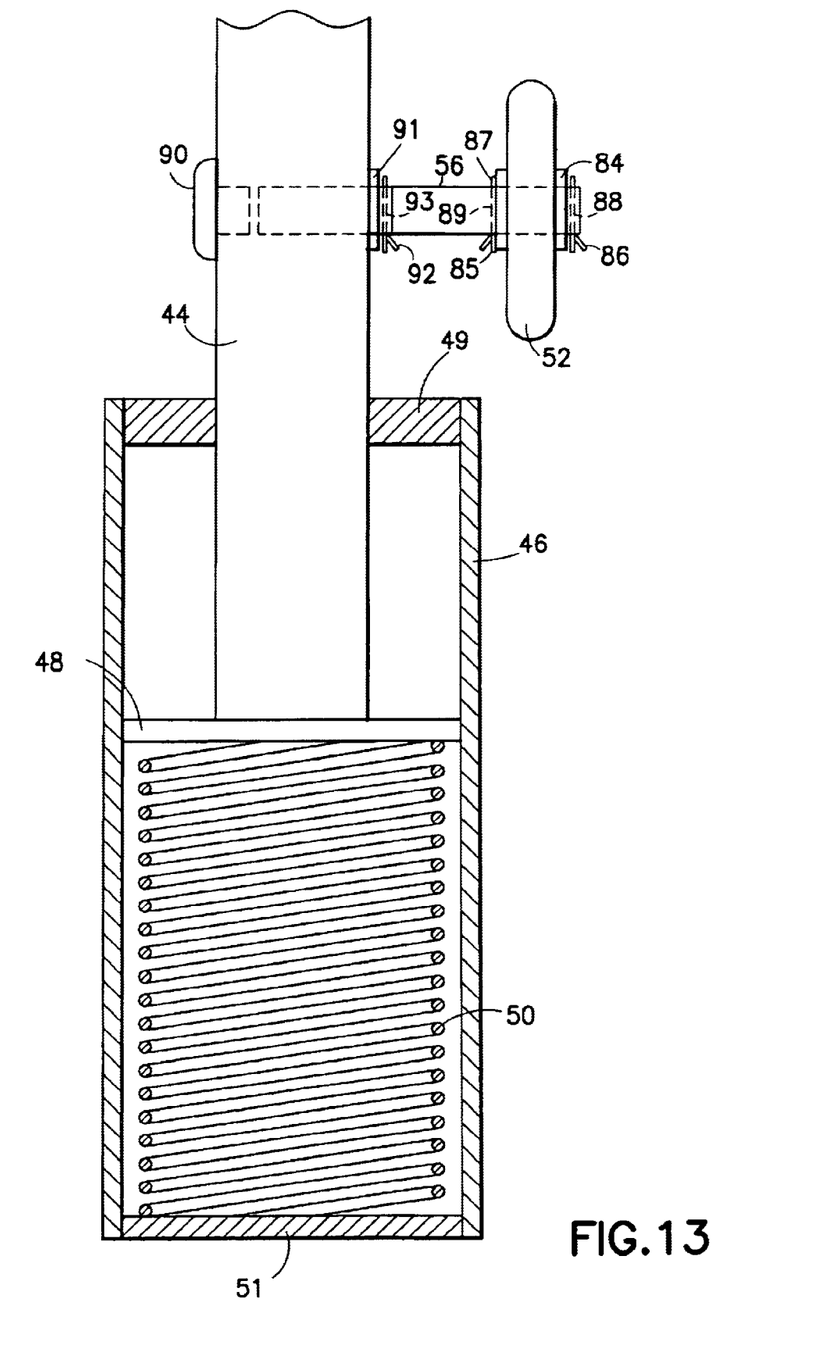
FIGS. 13 and 14 are views similar to FIG. 12 showing another modification of the truck cover assembly.
Figure 14:
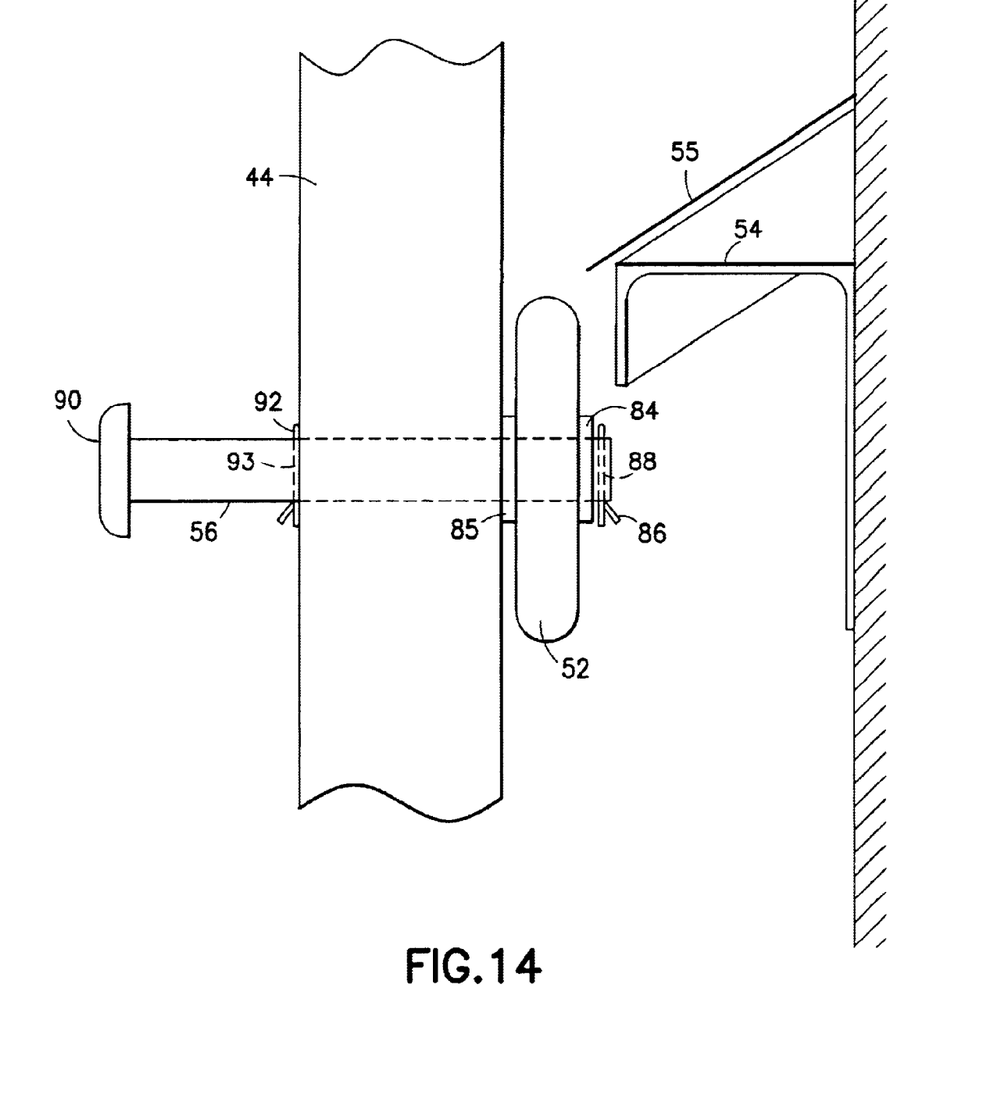

Another modification which is useful in those situations where it may be desirable to employ the roll-up cover assembly without the reduced height feature or when it is necessary to replace the roller 52, for example, is shown in FIGS. 13 and 14. In this modification, the roller 52 is mounted to the shaft 56 using one of a pair of washers 84, 85, one on each side of the roller, and cotter pins 86, 87 passing through holes 88, 89, securing the washers in place on the shaft. The shaft 56 in this case extends through the first or upper telescoping member 44 and is formed with a flanged opposite end as at 90 which sets or positions the roller 52 in place inside the guide track 54 (not shown in FIG. 13). The shaft 56 is secured in this position by another washer 91 and cotter pin 92 passing through a hole 93 in the shaft next to the upper member 44.

To displace the roller 52 from its position inside the guide track 54 and thus render the height reduction feature inoperable such as to replace the roller, it is a simple matter to remove the cotter pin 92 and push the shaft 56 and roller 52 in a direction toward the upper member 44 to a new location outside of the track 54 as shown in the view of FIG. 14. The roller 52 can be locked in this new location by placing the cotter pin 92, removed before relocating the shaft 56, through a hole 93 provided in the shaft 56. The position of the hole 93 in the shaft 56 is chosen such that when the roller 52 is pushed all the way up against the side wall of upper member 44, the hole 93 will be aligned just outside the opposite side wall of the upper member 44.

Figure 15:
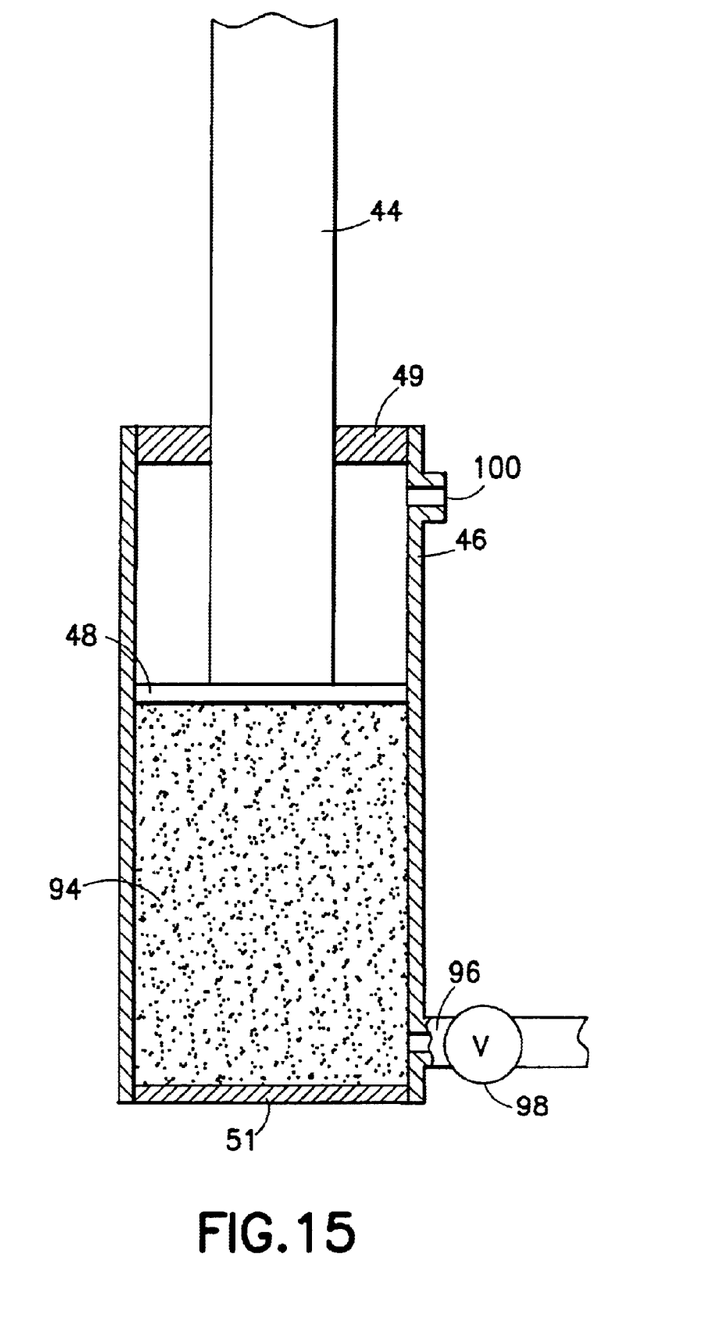
FIGS. 15 and 16 are views similar to FIGS. 4 and 11 showing still another modification of the truck cover assembly.
Figure 16:
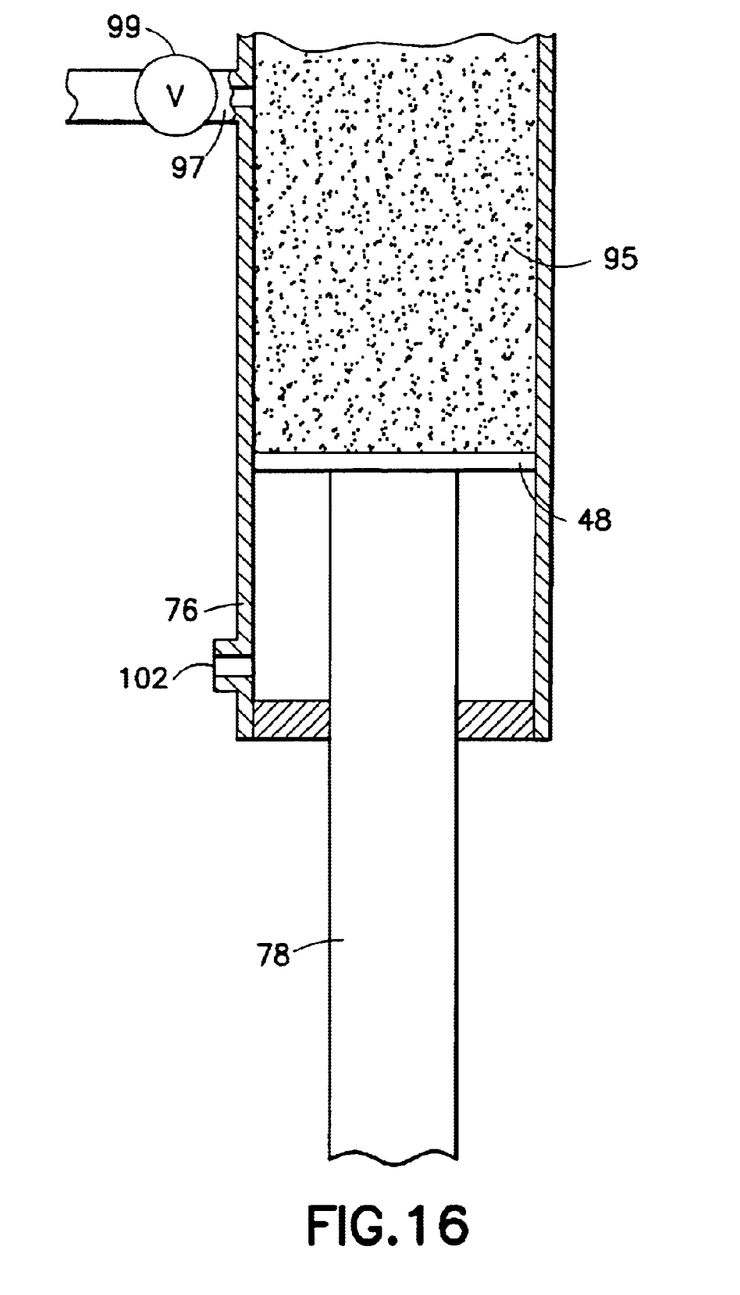

Still another modification of the present truck cover assembly is shown in FIGS. 15 and 16. In this modification, the spring used in the larger diameter telescoping lower or upper members 46, 76 is replaced by sealed chambers 94, 95, respectively, which are filled with air or a compressible gas serving as the biasing medium. The chambers 94, 95 are filled with air or gas via the inlet openings 96, 97 and check valves 98, 99. The lower and upper members 46, 76 are also provided with vents 100, 102 to bleed air or gas out from above and below the chambers 94, 95, respectively, during operation of the truck cover assembly.

What is claimed is:

1. A roll-up truck cover assembly for use on trucks having a generally rectangular open truck body defined by upstanding opposite side and end walls; said cover assembly comprising:

a generally rectangular flexible top cover which is substantially co-extensive with the opening of said truck body; said top cover having one end attached to one of said end walls of said truck body;

a take-up roll for said flexible top cover having opposite ends, said take-up roll being attached to an opposite end of said cover and extending substantially across its width, said take-up roll having an associated biasing member tending to rotate the roll in a take-up operation of the cover;

a pair of elongated swinging arms one of each of which is positioned adjacent to one of said opposite side walls of said truck body, each of said swinging arms comprising first and second elongated members at least one of which is tubular and the other of which is telescopically and retractably mounted within said tubular member such that the length of said arms is variable and can be changed by sliding one member in or out of the other, said first member being rotatably connected to one of said opposite ends of said take-up roll and said second member being pivotally mounted to a lower end portion of one of said opposite side walls of said truck body;

a pair of rollers one of each of which is rotatably mounted onto one of a pair of shafts, each one of said shafts being attached to said first elongated member;

biasing means provided within said tubular first or second member;

a pair of elongated guide roller tracks one of each of which is mounted substantially longitudinally to one of said opposite side walls of said truck body;

each one of said pair of rollers being moveable engaged within one of said pair of roller tracks; and means for pivotally moving said pair of swinging arms longitudinally along said opposite side walls of said truck body in an arch-like manner from one opposite end to the other, the arrangement being such that movement of said rollers along said guide tracks causes said first or second member to retract within the other tubular member thereby keeping to a minimum the height to which said take-up roll and cover can be raised above said truck body.

2. A roll-up truck cover assembly according to claim 1, wherein said second elongated member of each swinging arm is tubular and wherein said first elongated member is telescopically and retractably mounted within said second member.

3. A roll-up truck cover assembly according to claim 2, wherein said biasing means is provided within said second member.

4. A roll-up truck cover assembly according to claim 3, wherein said biasing means is a spring.

5. A roll-up truck cover assembly according to claim 3, wherein said biasing means is air or a compressible gas sealed within said second member.

6. A roll-up truck cover assembly according to claim 3, wherein said roller guide track is an inverted U-shaped channel secured to one of said opposite side walls of said truck body and wherein said roller is maintained in moveable engagement with said channel by said biasing means in said second member.

7. A roll-up truck cover assembly according to claim 6, wherein a shield is provided over the top of said U-shaped channel to protect said channel and roller against damage.

8. A roll-up truck cover assembly according to claim 2, wherein said roller and shaft are mounted to said first elongated member using a mounting plate secured to said first member by U-bolts.

9. A roll-up truck cover assembly according to claim 2, wherein said roller and shaft are mounted to said first elongated member using a mounting plate secured directly to said first member.

10. A roll-up truck cover assembly according to claim 2, wherein said roller and shaft are mounted to said first elongated member by extending said shaft directly through said first member and securing said shaft in either one of two positions by a cotter pin passing through said shaft.

11. A roll-up truck cover assembly according to claim 1, wherein said first elongated member of each swinging arm is tubular and wherein said second elongated member is telescopically and retractably mounted within said first member.

12. A roll-up truck cover assembly according to claim 11, wherein said biasing means is provided within said first member.

13. A roll-up truck cover assembly according to claim 12, wherein said biasing means is a spring.

14. A roll-up truck cover assembly according to claim 13, wherein said biasing means is air or a compressible gas sealed within said first member.

15. A roll-up truck cover assembly according to claim 11, wherein said roller guide track is an inverted U-shaped channel secured to one of said opposite side walls of said truck body and wherein said roller is maintained in moveable engagement with said channel by said biasing means in said first member.

16. A roll-up truck cover assembly according to claim 15, wherein a shield is provided over the top of said U-shaped channel to protect said channel and roller against damage.

17. A roll-up truck cover assembly according to claim 11, wherein said roller and shaft are mounted to said first elongated member using a mounting plate secured to said first member by U-bolts.

18. A roll-up truck cover assembly according to claim 11, wherein said roller and shaft are mounted to said first elongated member using a mounting plate secured directly to said first member.

* * * * *